(12) United States Patent
Drott et al.

(10) Patent No.: US 7,131,520 B2
(45) Date of Patent: Nov. 7, 2006

(54) ACTUATOR UNIT FOR AN ELECTRO-HYDRAULIC BRAKE SYSTEM

(75) Inventors: Peter Drott, Frankfurt am Main (DE); Peter Volz, Darmstadt (DE); Thomas Bartsch, Niedernhausen (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/484,995

(22) PCT Filed: Jul. 25, 2002

(86) PCT No.: PCT/EP02/08288

§ 371 (c)(1),
(2), (4) Date: Jun. 28, 2004

(87) PCT Pub. No.: WO03/011662

PCT Pub. Date: Feb. 13, 2003

(65) Prior Publication Data

US 2005/0116534 A1  Jun. 2, 2005

(30) Foreign Application Priority Data

Jul. 27, 2001 (DE) .................... 101 36 814
Jul. 31, 2001 (DE) .................... 101 37 276
May 18, 2002 (DE) .................... 102 22 270

(51) Int. Cl.
    *B60T 11/30* (2006.01)
(52) U.S. Cl. .................................... 188/352
(58) Field of Classification Search ............ 303/114.1, 303/113.4, 358, 114.2, 115.1, 87, DIG. 1, 303/DIG. 2; 60/566, 591, 582, 592, 562, 60/594; 188/152, 352
See application file for complete search history.

(56) References Cited

U.S. PATENT DOCUMENTS

| | | | | |
|---|---|---|---|---|
| 4,665,701 A | * | 5/1987 | Bach ........................... | 60/562 |
| 6,192,685 B1 | * | 2/2001 | Bourlon et al. ............... | 60/566 |
| 6,808,238 B1 | * | 10/2004 | Drott et al. .................. | 188/358 |

FOREIGN PATENT DOCUMENTS

| | | |
|---|---|---|
| DE | 3312192 | 10/1984 |
| DE | 69007910 | 4/1994 |
| DE | 19603909 | 8/1997 |
| DE | 19822411 | 8/1999 |
| DE | 10039238 | 10/2001 |
| DE | 10044820 | 10/2001 |

(Continued)

OTHER PUBLICATIONS

Search Report of the German Patent Office for Appln 10222270.3.

*Primary Examiner*—Thomas Williams

(57) ABSTRACT

An actuator unit for an electro-hydraulic brake system of the 'brake-by-wire' type, the first and second pistons thereof being preloaded by a resetting spring each in opposition to the actuating direction. The first pressure chamber of the tandem master cylinder is connected to a hydraulic chamber limited by a simulator element. On the other hand, the simulator element defines a simulator chamber that accommodates a simulator spring and is connected to a pressure fluid reservoir. A valve device is provided to open or close the hydraulic connection between simulator chamber and pressure fluid reservoir. To increase the reliability in operation of a hydraulic fallback mode, at least one channel portion through the pressure chamber, closed at the edge at least in areas, is provided for the purposeful removal of pressure fluid contaminants by means of a compulsory pressure fluid scavenging operation.

11 Claims, 4 Drawing Sheets

FOREIGN PATENT DOCUMENTS

| | | |
|---|---|---|
| DE | 10147180 | 6/2002 |
| EP | 0869293 | 10/1998 |
| GB | 2261712 | 5/1993 |
| WO | 9204215 | 3/1992 |

* cited by examiner

ACTUATOR UNIT FOR AN ELECTRO-HYDRAULIC BRAKE SYSTEM

TECHNICAL FIELD

The present invention generally relates to brake systems and more particularly relates to actuator units for electro-hydraulic brake systems.

BACKGROUND OF THE INVENTION

DE 198 22 411 A1 discloses an actuator unit of this general type.

Because a vehicle operator is decoupled from the physical generation of brake force in electro-hydraulic brake systems (EHB) and the braking demand is realized electrically 'by wire', a travel simulator is used reproducing the tactile pedal feedback which simulates the reaction force of a conventional brake system. In addition, the actuator unit includes means allowing a hydraulic emergency braking operation when the electronics is defective by means of direct application of the wheel brakes (so-called hydraulic fallback mode). Outside the hydraulic fallback mode a request for actuation is detected in the by-wire mode as a result of sensing e.g. an actuating travel of the brake pedal, and separating valves are closed to shut off the direct hydraulic throughgrip in the direction of the wheel brakes. While the braking pressure buildup is initiated in an electrohydraulic fashion, a reaction force is imparted to the vehicle operator due to a volume displacement into the travel simulator corresponding to the actuating movement.

The hydraulic fallback mode is of utmost importance. Air that is drawn into the hydraulic circuit (due to leakages or the like) can impair or prevent the functioning of the hydraulic fallback mode because the pressure fluid when mixed with air) reacts compressibly. The minimum requirement of an emergency braking operation as mandated by law—without servo boosting—is not reached. Any air that enters the system will migrate to the highest points of the brake system. Preferred concentration points are the pressure chambers, what is due to a principally inclined mounting position of the actuator unit in the motor vehicle.

The above-mentioned publication does not disclose measures that would allow eliminating or significantly reduce a malfunction that occurs in by-wire brake systems, which is caused by compressibility (or other contamination).

Patent application DE 10147180.7, which is not prior-published, discloses an electronically controllable brake actuation system with means for the electronically controlled separation of contaminants contained and/or dissolved in the brake fluid.

BRIEF SUMMARY OF THE INVENTION

An object of the present invention is to disclose an actuator unit of the initially mentioned type that improves the availability of the hydraulic fallback mode.

According to the invention, this object is achieved in that the actuator unit includes at least one channel portion that is closed at least in areas and extends through a pressure chamber, for the purpose of removing contaminants in the pressure fluid by means of a pressure fluid scavenging operation. Principally, the pressure chambers can comprise several indirectly or directly adjacent channel portions. The invention basically founds on the fundamental idea of providing a compulsory guide for the pressure fluid scavenging operation.

The invention permits the purposeful removal of contaminants, in particular the entry of air or gas from the actuator unit by means of a pressure fluid scavenging operation by using small pressure fluid volume flows. Consequently, the scavenging operation at the wheel brakes brings about no or only a low impact pressure so that the friction linings are not pressed in the direction of the brake disc, or only to an insignificant extent. This feature allows executing a scavenging operation during driving and without unnecessary friction lining wear.

Impairment of comfort due to the development of noise of great volume flows is avoided. Because an intense evacuation of the accumulator is prevented, the scavenging process can be executed with low energy consumption.

According to a favorable embodiment of the invention, the channel portion is arranged between the reservoir port of the first or the second pressure chamber and the respective outlet. The result is that the pressure fluid flow is discharged specifically into the pressure fluid reservoir starting from the outlets on the brake circuit side through the pressure chambers and central valves associated with the pistons via the reservoir ports. Degassing/scavenging of the pressure fluid is executed there.

The piston and another component added to the piston or abutting thereon can form a channel portion. For example, the channel portion can be defined by the second piston that is provided with a spring plate, extending beyond the central valve, for the second resetting spring so that the spring plate along with the second piston limits the channel portion.

A change in direction is achieved when each pressure chamber includes an axially extending channel portion and a substantially radially extending channel portion according to a preferred embodiment of the invention.

It is advantageous that for forming the channel portion associated with the first pressure chamber there is provision of a first tubular sleeve arranged centrically to the first piston and a second tubular sleeve (telescopic sleeve) that is arranged concentrically to the first sleeve and axially displaceable relative to the first sleeve. The sleeves allow simple and low-cost manufacture and permit a direct flow guide.

When the first sleeve is fixed to the first piston and includes a stop for the second sleeve that is preloaded elastically to the first sleeve by means of the resetting spring, this achieves an elastically preloaded captivation of the first resetting spring on the first piston beside a directed flow guide.

Preferably, the second sleeve includes an end face for abutment on the second piston, and the end face includes a groove pointing to the direction of the outlet for the pressure fluid scavenging operation. The channel portion is defined by groove surface and piston surface when these parts bear against one another in an initial position on account of the prevailing forces of the resetting springs.

For rerouting of the flow, the groove is provided essentially at right angles relative to the channel portion formed by the sleeves.

A further improved fluid inflow and penetration of central valves of the actuator unit is achieved when the channel portion formed by the sleeves is in alignment with a central valve, which is arranged so that it is movably guided on the piston side.

In a favorable embodiment of the invention, a channel portion formed of telescopically movable sleeves is associated with the pressure chamber, one sleeve thereof being provided at the piston, while the other sleeve is arranged on the housing and opens into a housing channel.

DETAILED DESCRIPTION OF THE PREFERRED EMBODIMENTS

Figure 1:
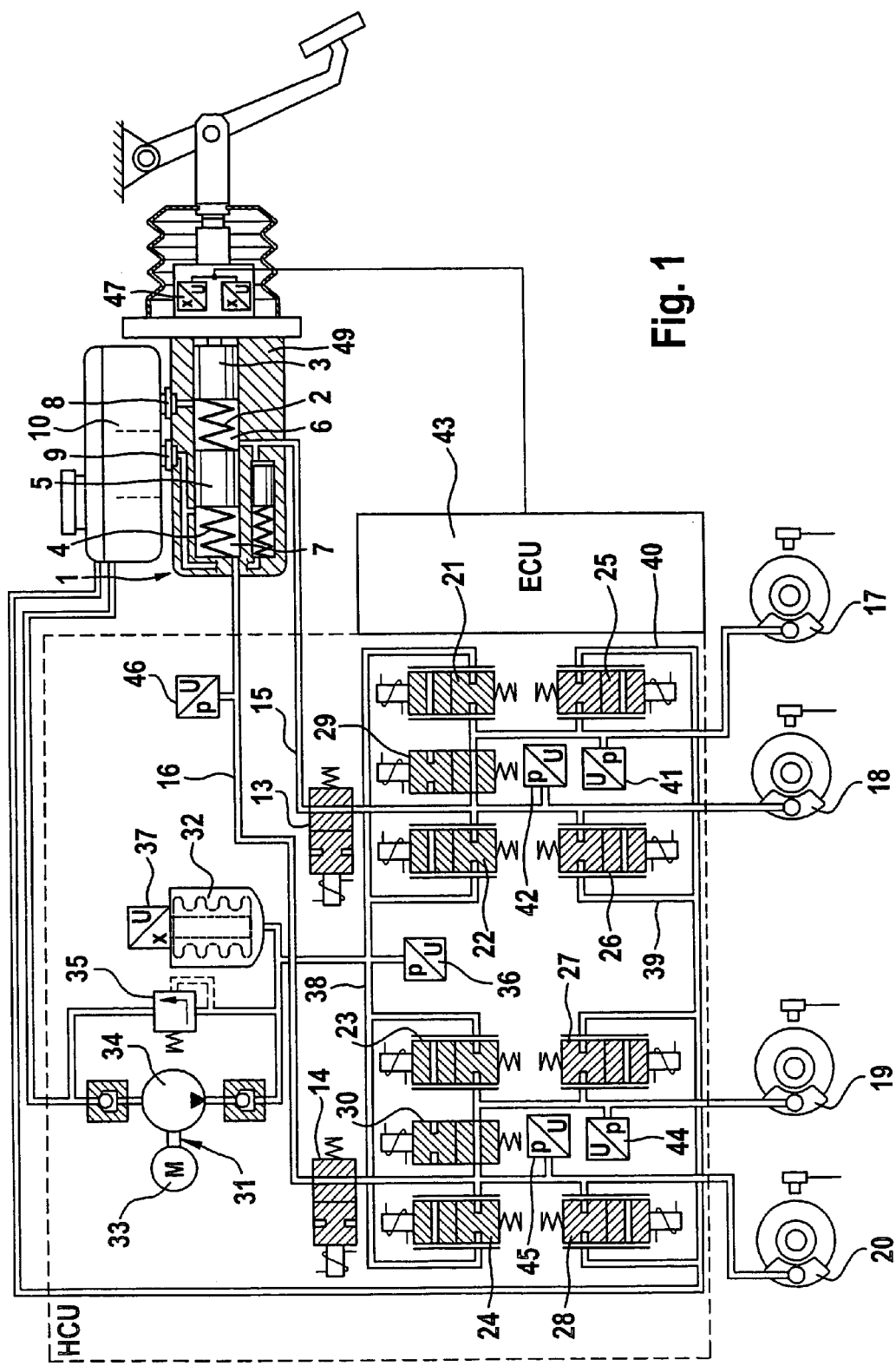
FIG. 1 is a schematic wiring diagram of a prior-art electro-hydraulic brake system of the 'brake-by-wire' type.

An electro-hydraulic brake system of the 'brake-by-wire' type as illustrated in FIG. 1 comprises an actuator unit 1 operable by an actuating pedal (not referred to in detail). The actuator unit 1 is essentially designed as a dual-circuit pressure generator or tandem master cylinder and comprises a first piston 3 preloaded by a first resetting spring 2 and a second piston 5 preloaded by a second resetting spring 4, said pistons being arranged separately of each other in tandem in a housing 49 and limiting pressure chambers 6, 7 which are connected to a non-pressurized pressure fluid reservoir 10 by way of reservoir ports 8, 9. As can be seen, the resetting springs 3, 4 cause a preload of the pistons 3, 5 in opposition to their actuating direction in a (non-actuated) initial position. The pressure chambers 6, 7 are connected to wheel brakes 17, 18, 19, 20 of a front-axle brake circuit and a rear-axle brake circuit by way of an outlet 11, 12 and a hydraulic line 15, 16 closable by means of a valve device 13, 14.

Associated with each of the wheel brakes 17, 18, 19, 20 is a normally closed inlet valve 21, 22, 23, 24 and a normally closed outlet valve 25, 26, 27, 28, and each one electromagnetically operable, preferably normally open (NO) pressure-compensating valve 29, 30 (balance valve) that allows wheel-individual brake pressure control in the by-wire mode when in the closed condition being inserted into a hydraulic connection between the inlet valves 21, 22; 23, 24 of an axle. As can be taken from FIG. 1, the design of the brake circuits of front axle and rear axle is identical.

As can further be taken from the drawings, a motor-pump assembly 31 used as an independent pressure source and having a high-pressure accumulator 32 is provided which, in turn, is composed of a pump 34 driven by an electric motor 33 and a pressure limiting valve 35 connected in parallel to pump 34. The suction side of pump 34 is connected to the above-mentioned pressure fluid reservoir 10 by way of a non-return valve (not shown), while a pressure sensor 36 monitors the hydraulic pressure generated by pump 34. The filling level of the high-pressure accumulator 32 is monitored by means of a travel sensor 37 (only represented) for a media-separating element (not shown).

A hydraulic line 38 connects the pressure side of the pump 34 or the high-pressure accumulator 32 with inlet ports of electromagnetically operable, preferable normally closed (NC) inlet valves 21, 22, 23, 24 connected upstream of the wheel brakes 17, 18, 19, 20. Further, hydraulic lines 39, 40 are connected to the outlet ports of the inlet valves 21, 22 and are in communication with the non-pressurized pressure fluid reservoir 10 and wherein in each case the electromagnetically operable, preferably normally closed (NC) outlet valve 25, 26 is inserted. This applies basically also to the valves 23, 24. In addition, pressure sensors 41, 42, 44, 45 are associated with the wheel brakes 17, 18, 19, 20 and used to determine the hydraulic pressure that prevails in the wheel brakes 17, 18, 19, 20. An electronic control unit 43 is used to actuate the motor-pump assembly 31 and the mentioned valves, and especially the output signals of pressure sensors 36, 41, 42, 44, 45, 46 of the travel sensor 37 and a braking demand detection device 47 (pedal travel sensor) of preferably redundant design are sent to said electronic control unit 43.

Figure 2:
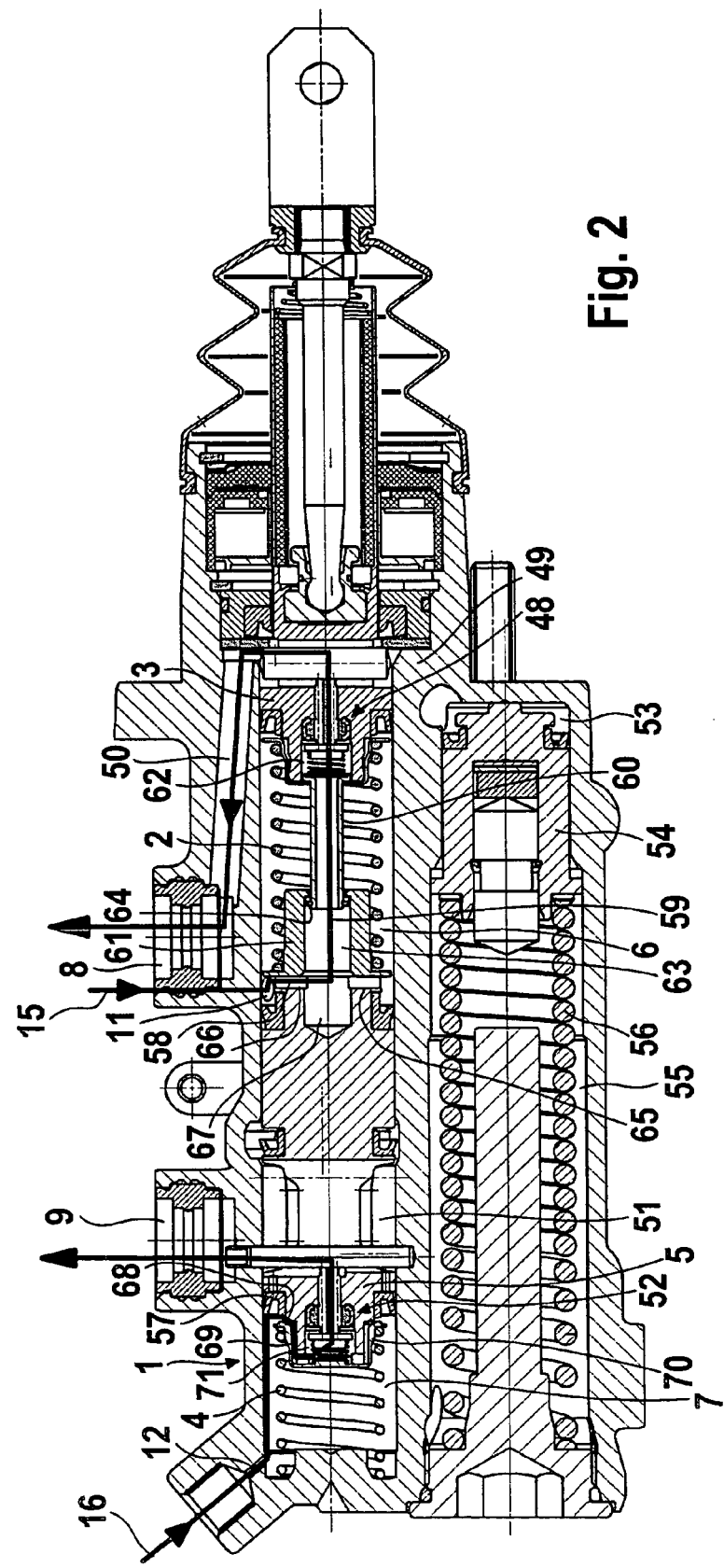
FIG. 2 is a cross-sectional view of an embodiment of an actuator unit.
Figure 3:
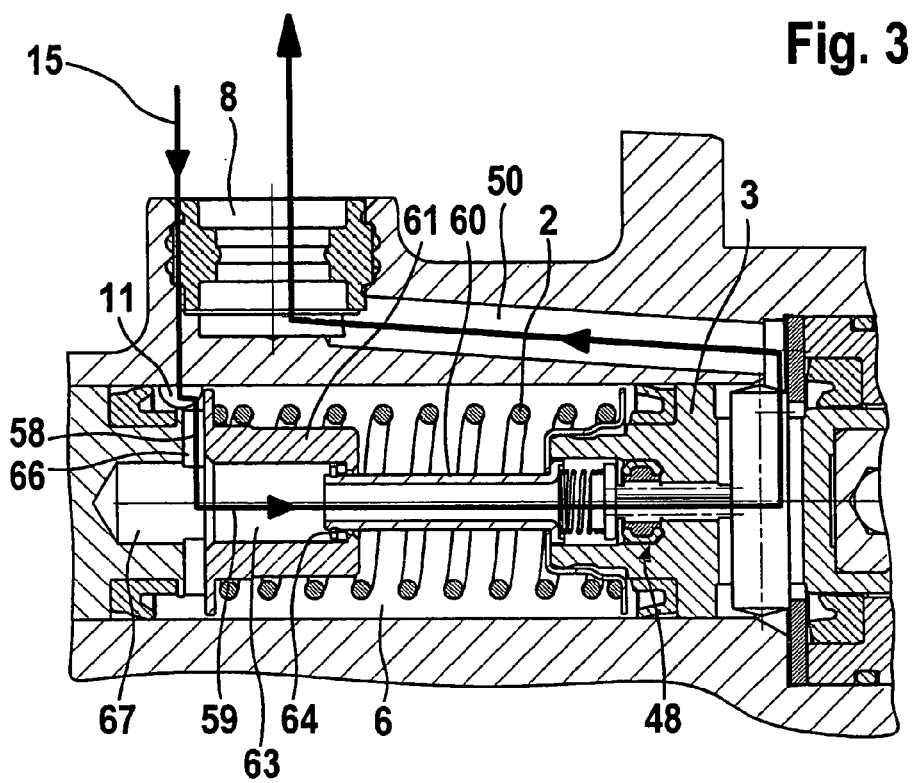
FIG. 3 is an enlarged detail view (push rod circuit) of the actuator unit in FIG. 2.
Figure 4:
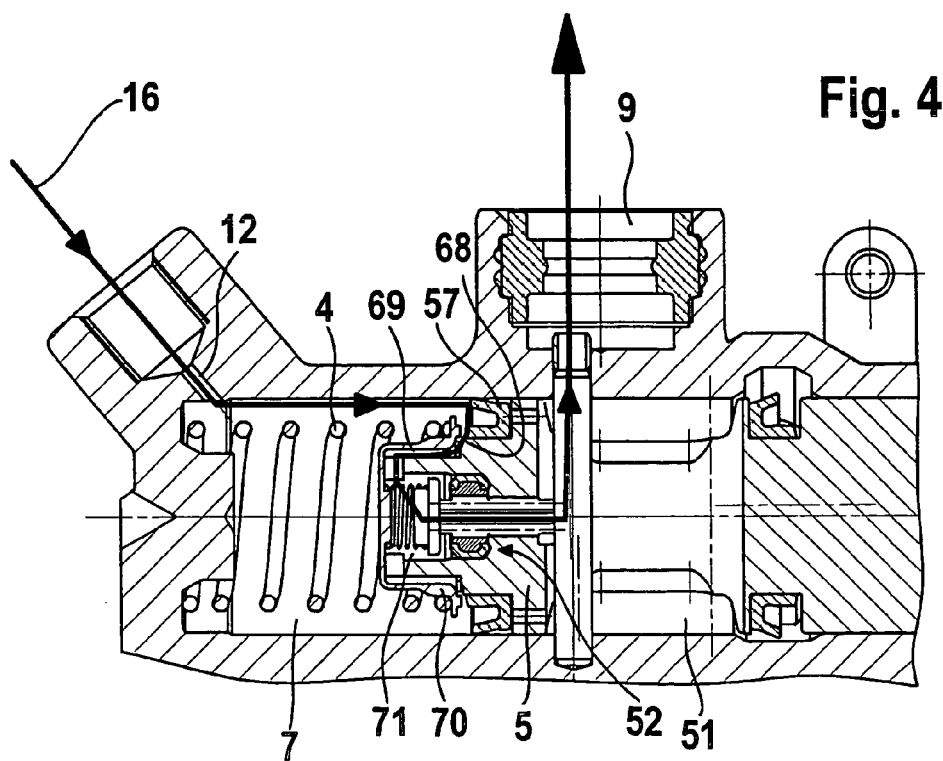
FIG. 4 is an enlarged detail view (secondary circuit) of the actuator unit in FIG. 2.

As shown in detail in particular in FIG. 2, each of the two pistons 3, 5 includes a central valve 48, 52 that is open in its initial position and closed in an actuating position. While the (primary) pressure chamber 6 defined by the housing 49 is in closable connection to the pressure fluid reservoir 10 by means of a pressure fluid channel 50, by the intermediary of a central valve 48 opened for pressure compensation in the initial condition, the second piston 5 confines a supply chamber 51 which is connected to the associated pressure chamber 7 by way of the central valve 52, on the one hand, and to the pressure fluid reservoir 10 by way of a pressure fluid channel (not shown) designed in the master cylinder housing, on the other hand.

By way of a hydraulic connection not illustrated in the Figures, pressure chamber 6 is connected to a hydraulic chamber 53 that is defined by a hydraulic piston or simulator piston 54. Said simulator piston 54 defining a simulator 55, on the other hand, together with a simulator spring 56 arranged in the simulator chamber 55 forms a travel simulator that imparts the normal pedal feeling to the operator of the vehicle when the valve devices 13, 14 are closed. As this occurs, simulator spring 56 determines the course of the pedal characteristics, meaning the dependency of the pedal force on the actuating travel.

To permit a relative movement of the first piston 3 with respect to the housing 49 when the pressure chambers 6, 7 are closed, and the result of said movement is that the pressure fluid volume displaced from the first pressure chamber 6 is applied to the hydraulic chamber 53, a hydraulic connection that will be interrupted or closed in the case of emergency braking can be provided between the simulator chamber 55 and the above-mentioned supply chamber 51 or the pressure fluid reservoir 10 according to FIG. 2. The mentioned hydraulic connection can be configured as a bore or channel, and a seal or sealing cup 57 arranged at the second piston 5 is provided in the mouth area in the supply chamber 51 thereof. The mouth area of the channel together with the sealing cup 57 forms a third valve device. It is achieved by the described arrangement that the pressure fluid can be displaced out of the first pressure chamber past the (immovable) sealing cup 57 into the pressure fluid reservoir 10, when the second pressure chamber 7 is closed.

On the other hand, the two pistons 3, 5 are displaced in an emergency braking operation where the above-mentioned valve devices 13, 14 stay open so that the sealing cup 57 arranged on the second piston 5 will override the mouth of the channel and thereby interrupt the connection between the simulator chamber 55 and the pressure fluid reservoir 10 so that the travel simulator can no longer take up pressure fluid volume and hydraulic pressure can develop in the two pressure chambers 6, 7 to actuate the wheel brakes 17, 18, 19, 20.

Further details with regard to the functioning of the actuator unit may be taken, for example, from patent application DE 10016596.6, the disclosure of which is included in full extent in the present disclosure.

To separate contaminants such as gas or air portions disposed in the brake system, a pressure scavenging routine that is preferably controlled electronically by way of a data processing program is carried out in a separate process step. Pressure fluid flow is built up by pump 34 or high-pressure accumulator 32 that is opposed to the direction of flow in the hydraulic fallback mode that is due to actuation. More specifically, the pressure fluid flow enters in each case through the outlets 11, 12, passes through the pressure chambers 6, 7 of the actuator unit 1 and propagates via the reservoir ports 8, 9 into the pressure fluid reservoir 10 where gas or air parts will degas. A scavenging routine is preferably composed of four scavenging cycles of about four seconds each, there being a pause of roughly one second between the individual scavenging cycles. The scavenging cycle causes a pressure of a maximum of roughly 0.2 to 0.6 bar in the pressure chambers 6, 7 which corresponds to a dynamic pressure of a maximum of roughly 12 bar in the wheel brakes 17, 18, 19, 20.

For the defined guiding of the flow, the actuator unit 1 includes channel portions that are at least in areas closed at their edges and extend through the pressure chambers 6, 7. As FIG. 2 shows, the channel portions are provided each between the reservoir port 8, 9 of the first or the second pressure chamber 6, 7 and the respective outlet 11, 12.

Initially, reference is made to the course of flow in the first pressure chamber 6 (for the so-called push rod circuit, DK) that is greatly simplified by way of a curve. Starting from the represented line 15, the pressure fluid propagates through outlet 11, through a channel portion 58 that points in a substantially radial direction towards outlet 11, and a channel portion 59 that is provided at right angles to the channel portion 58, through the central valve 48 opened in the initial condition into the pressure fluid channel 50 and from there into the pressure fluid reservoir 10. The horizontal channel portion 59 is substantially formed by a first tubular sleeve 60 arranged centrically to the first piston 3 and a second tubular sleeve 61 that is arranged concentrically to the first sleeve 60 and axially relatively displaceable to the first sleeve 60. The sleeve arrangement is thus adapted to be telescoped in length. The first sleeve 60 is fixed at the piston 3 and opens into a bore 62 for the accommodation of the central valve 48. The other end of the first sleeve 60 opens into a tubular inside chamber 63 of the second sleeve 61. A stop 64 for the second sleeve 61 causes a captivation and elastic preload of the resetting spring 2 that is active between the two sleeves 60, 61. It goes without saying that the passage through the central valve 48 belongs to the horizontal channel portion 59. To form the channel portion 58, the second sleeve 61 has an end face 65 for abutment on a backside of the second piston 5. A groove 66 directed towards outlet 11 is provided in end face 65. The flow is deviated from the radial direction into the axial direction preferably but not imperatively within a recess 67 of the second piston 5.

In the following, reference is made to the guiding of the flow in the second pressure chamber 7 (for the so-called secondary circuit, SK). Starting from the outlet 12, the pressure fluid and any contaminants collected in the upper area of a wall will initially propagate axially through the pressure chamber 7 to enter through an inlet aperture 68 into a channel portion 69 which is provided between the second piston 5 and a component 70 that abuts thereon. As can be taken from FIG. 2, a spring plate that extends over the central valve 52 is provided as a second component 70 for centering the resetting spring 4. The bowl-shaped spring plate may include depressions for subdividing several channel portions 69. Through a bore 71 accommodating the central valve 52, pressure fluid propagates through the central valve 52 that is open in its initial condition, into supply chamber 51 opening into which is a hydraulic channel (not shown) covered by a pin. From this channel the pressure fluid is conducted to the reservoir port 9 and finally into the pressure fluid reservoir 10.

Figure 5:
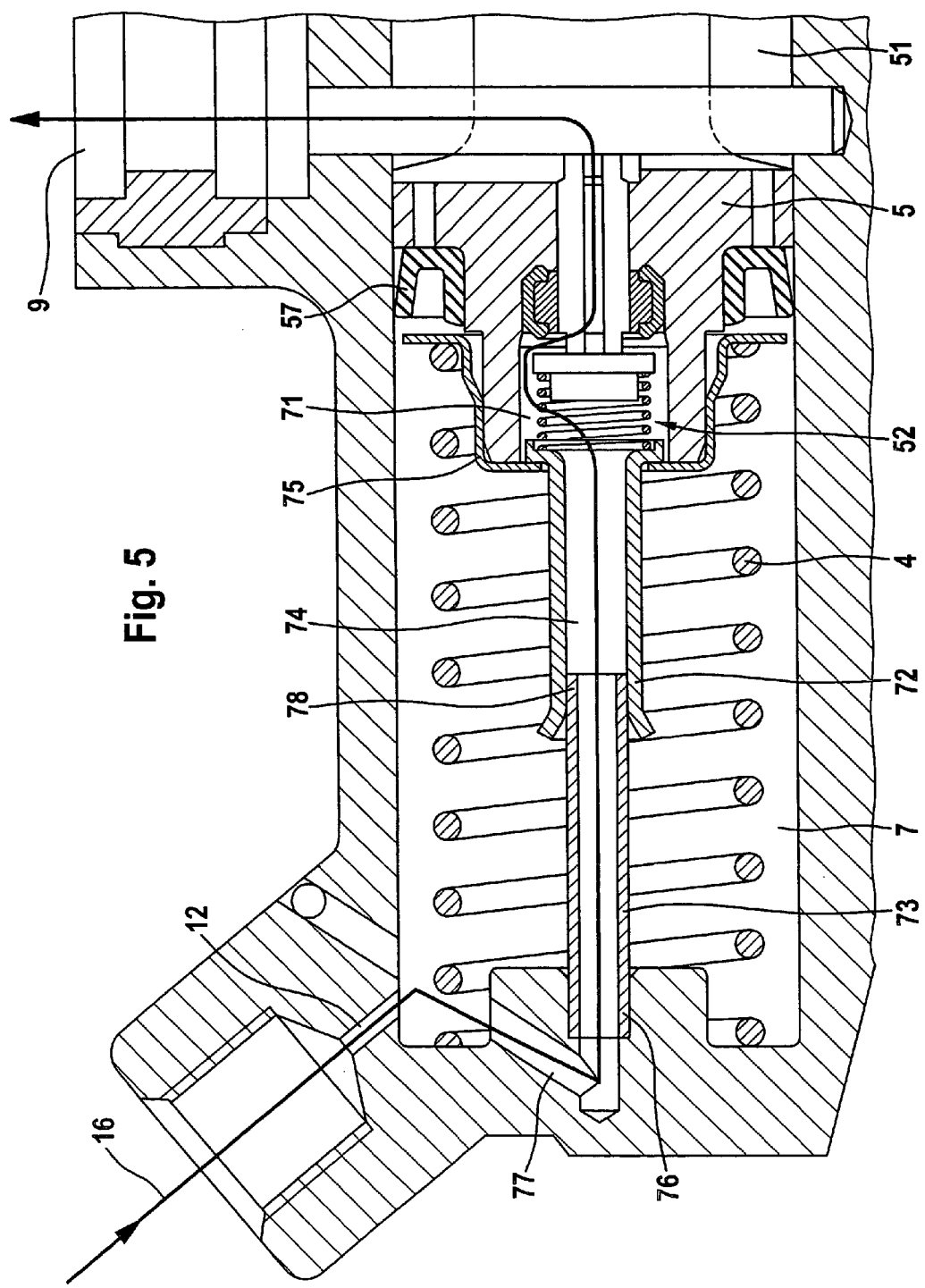
FIG. 5 is a detail view of a modified embodiment.

In a modified embodiment according to FIG. 5, the second pressure chamber 7 also houses a horizontal channel portion 74 that is formed of two telescopically movable sleeves 72, 73. In the Figures, generally corresponding components of different embodiments have been assigned identical reference numerals. A spring plate 75 is used to center and abut the resetting spring 4 on the second piston 5. The first sleeve 72 fixed to the piston 5 penetrates with a tubular hollow portion the spring plate 75 and a part of the pressure chamber 7. The second sleeve 73 with an end 76 is immovably slid into the master cylinder housing and opens into a housing channel 77 that is connected to line 16 by way of outlet 12. The other end 78 of the second sleeve 73 enters into first sleeve 72, which latter, as a result, is arranged so that it is movably guided in sleeve 73. This achieves a channeled flow guide through the pressure chamber 7 and the central valve 52. A particularly effective evacuation of the actuator unit 1 can be achieved by using telescopic sleeve arrangements in both pressure chambers 6, 7.

As can be seen, a scavenging effect takes place with each by-wire brake application—by the mere application of the brake. This is because closing of the central valves 48, 52 requires displacement of pressure fluid volume which is completed after the valve devices 13, 14 have separated the pressure chambers 6, 7 from the wheel brakes 17, 18, 19, 20. More specifically, a scavenging operation takes place in the direction of the pressure fluid reservoir 10 until the central valves 48, 52 close.

1 actuator unit
2 resetting spring
3 piston
4 resetting spring
5 piston
6 pressure chamber
7 pressure chamber
8 reservoir port
9 reservoir port
10 pressure fluid reservoir
11 outlet
12 outlet
13 valve device
14 valve device
15 line
16 line
17 wheel brake
18 wheel brake
19 wheel brake
20 wheel brake
21 inlet valve
22 inlet valve
23 inlet valve
24 inlet valve
25 outlet valve
26 outlet valve
27 outlet valve
28 outlet valve
29 pressure compensating valve 30 pressure compensating valve
31 motor-pump assembly
32 high-pressure accumulator
33 electric motor
34 pump
35 pressure-limiting valve
36 pressure sensor
37 travel sensor
38 line
39 line
41 pressure sensor
42 pressure sensor
43 control unit
44 pressure sensor
45 pressure sensor
46 pressure sensor
47 braking demand detection device
48 central valve
49 housing
50 pressure fluid channel
51 supply chamber
52 central valve
53 chamber
54 simulator piston
55 simulator chamber
56 simulator spring
57 sealing cup
58 channel portion
59 channel portion
60 sleeve
61 sleeve
62 bore
63 inside chamber
64 stop
65 end face
66 groove
67 recess
68 inlet aperture
69 channel portion
70 component
71 bore
72 sleeve
73 sleeve
74 channel portion
75 spring plate
76 end
77 housing channel
78 end

The invention claimed is:

1. Actuator unit, comprising:
a first piston operable by means of an actuating pedal and preloaded by a first resetting spring, and
a second piston preloaded by a second resetting spring, wherein said first and second pistons are arranged in tandem in a housing,
one or more limiting pressure chambers which are in connection to a non-pressurized pressure fluid reservoir by way of reservoir ports and are closably connected to brake circuits by way of outlets and valve devices associated with them, wherein the housing includes at least one channel portion that is closed in at least one area and extends through said one or more limiting pressure chambers, for removing pressure fluid contaminants by means of a pressure fluid scavenging operation.

2. Actuator unit as claimed in claim 1, wherein the channel portion is arranged between the reservoir port of the first or the second pressure chamber and the respective outlet.

3. Actuator unit as claimed in claim 1, wherein a channel portion is formed by a piston and at least one other component added to the piston or abutting thereon.

4. Actuator unit as claimed in claim 3, wherein at least one of the first or second pistons includes a spring plate extending beyond a central valve and limiting along with piston said channel portion.

5. Actuator unit as claimed in claim 1, wherein said one or more limiting pressure chambers includes at least one axially extending channel portion and a substantially radially extending channel portion.

6. Actuator unit comprising:
a first piston operable by means of an actuating pedal and preloaded by a first resetting spring, and
a second piston preloaded by a second resetting spring, wherein said first and second pistons are arranged in tandem in a housing,
one or more limiting pressure chambers which are in connection to a non-pressurized pressure fluid reservoir by way of reservoir ports and are closably connected to brake circuits by way of outlets and valve devices associated with them, wherein the housing includes at least one channel portion that is closed at least in areas and extends through said one or more limiting pressure chambers, for removing pressure fluid contaminants by means of a pressure fluid scavenging operation wherein the channel portion associated with the first pressure chamber there is comprised of a first tubular sleeve arranged centrically to the first piston and a second tubular sleeve that is arranged concentrically to the first sleeve and axially displaceable relative to the first sleeve.

7. Actuator unit as claimed in claim 6, wherein the first sleeve is fixed to the first piston and includes a stop for the second sleeve that is preloaded elastically to the first sleeve by means of resetting spring.

8. Actuator unit as claimed in claim 6, wherein the channel portion formed by the first and second sleeves is in alignment with a central valve that is arranged so that it is movably guided on a piston side.

9. Actuator unit as claimed in claim 6, wherein the second sleeve includes an end face for abutment on the second piston, and
wherein the end face includes at least one groove pointing to the direction of the outlet for the pressure fluid scavenging operation.

10. Actuator unit as claimed in claim 9, wherein the direction the groove extends is essentially at a right angle relative to the channel portion formed by the first and second sleeves.

11. Actuator unit, comprising:
a first piston operable by means of an actuating pedal and preloaded by a first resetting spring, and
a second piston preloaded by a second resetting spring, wherein said first and second pistons are arranged in tandem in a housing,
one or more limiting pressure chambers which are in connection to a non-pressurize pressure fluid reservoir by way of reservoir ports and are closably connected to brake circuits by way of outlets and valve devices associated with them, wherein the housing includes at least one channel portion that is closed at least in areas and extends through said one or more limiting pressure chambers, for removing pressure fluid contaminants by means of a pressure fluid scavenging operation, wherein a channel portion formed of telescopically movable sleeves associated with the pressure chamber, wherein at least on telescopically moveable sleeves are provided at the piston while sleeve is fixed to the housing and opens into said housing channel.

* * * * *